United States Patent [19]

Babusci et al.

[11] 3,740,819

[45] June 26, 1973

[54] METHOD OF REDUCING THE INCIDENCE OF SHORT CIRCUITS ON AIR-ISOLATED BEAM CROSSOVERS

[75] Inventors: Daniel Babusci, Oceanport; Burton Abram Unger, Berkeley Heights, both of N.J.

[73] Assignee: Bell Telephone Laboratories, Inc., Murray Hill, N.J.

[22] Filed: Dec. 21, 1970

[21] Appl. No.: 99,998

[52] U.S. Cl. ................ 29/401, 29/157.3 V, 29/421, 29/625, 156/6

[51] Int. Cl. ........................ B22d 19/10, B23p 7/00

[58] Field of Search ..................... 29/401, 625, 481, 29/526.2, 526.4, 157.3 V, 421; 156/6; 72/54

[56] References Cited

UNITED STATES PATENTS

| | | | |
|---|---|---|---|
| 3,461,524 | 8/1969 | Lepselter | 29/424 X |
| 3,466,726 | 9/1969 | Savolainen | 29/421 X |
| 2,990,608 | 7/1961 | Manning | 29/157.3 V |
| 3,371,399 | 3/1968 | Miller | 29/157.3 V |
| 3,432,905 | 3/1969 | Monroe | 29/423 X |

*Primary Examiner*—Charles W. Lanham
*Assistant Examiner*—D. C. Reiley, III
*Attorney*—W. L. Keefauver

[57] ABSTRACT

Deposited thin film circuitry having a large number of air-isolated crossovers is treated to reduce potential rejects because of crossover short circuits by causing the evolution of gas within a liquid in the region under the crossovers at a rate sufficient to lift the crossover beams without fracture, as by the reaction of a dilute acid with a bicarbonate or by the vigorous boiling of a volatile liquid such as alcohol, acetone or xylene, or by expanding initially liquid materials under the beam. The effectiveness is enhanced by a preliminary heating of the crossovers to a temperature above about 250°C.

6 Claims, 2 Drawing Figures

INVENTORS: D. BABUSCI
B. A. UNGER
BY: Edwin B. Cave
ATTORNEY

METHOD OF REDUCING THE INCIDENCE OF SHORT CIRCUITS ON AIR-ISOLATED BEAM CROSSOVERS

BACKGROUND OF THE INVENTION

1. Field of the Invention

This invention relates to methods of clearing crossover short circuits in conductive film circuitry.

2. Description of the Prior Art

The production of conductive film circuitry in complex patterns on one side of an insulating substrate has been dependent upon the development of reliable insulated crossovers.

Techniques for producing air-isolated beam crossovers, as described for instance in U. S. Pat. No. 3,461,524, issued Aug. 19, 1969 to Lepselter, have proved capable of high yield production of individual crossovers free from short circuits. Techniques taught by this patent for reducing the number of columnar short circuits between crossover and crossunder are etching, oxidation, ultrasonic vibration and centrifuging. However, in circuitry involving a large number of crossovers, often hundreds or thousands on a single substrate, even a very small percentage of short-circuited crossovers can lead to an intolerably high percentage of circuit rejects, rendering it necessary to resort to an expensive procedure of individually identifying the defective crossovers and individually repairing them so as to convert the rejected circuits to a usable form.

SUMMARY OF THE INVENTION

According to the present invention, short circuits in crossovers are cleared by causing evolution of a gas within a liquid under the crossovers at a rate sufficient to lift the crossover beams without fracturing them, thus disposing of conductive paths between the crossover beams and the conductors crossing under them. The effectiveness of this technique can be increased by either or both of an etching treatment or a prior heat treatment.

When the liquid beneath the crossover beam is of low viscosity and low surface tension, a vigorous evolution of gas is necessary in order to lift the beam and break the short circuit. With higher viscosity liquids or liquids of higher surface tension, a less vigorous evolution may be required.

DESCRIPTION OF DRAWING

In the accompanying drawing.

DETAILED DESCRIPTION

Figure 1:
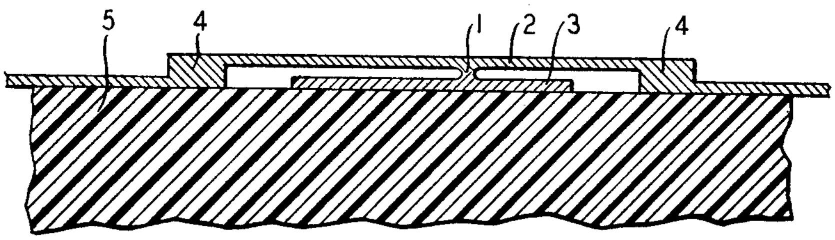
FIG. 1 is an enlarged view in cross section of a typical short-circuited crossover.
Figure 2:
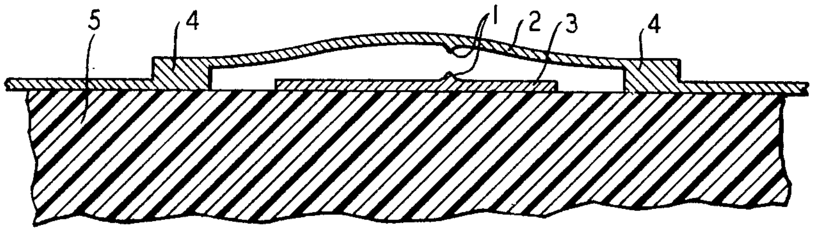
FIG. 2 is a view in section of the same crossover after the beam has been lifted by the process of the present invention so as to break the short circuit.

In the typical short-circuited crossover shown in the drawing, before (FIG. 1) and after (FIG. 2) treatment by the process of the present invention, the defect 1 causing the short circuit between the crossover beam 2 and the crossunder conductor 3 is a pillar of metal which is introduced by an aberration in the process of creating the crossover. Another common type of short circuit is caused simply by the lodging of particles of metallic debris under the crossover during its process of manufacture. A large percentage of both types of short circuit is eliminated by the process of the present invention, which results in a lifting of the crossover beam as shown in FIG. 2 and a flushing of the space beneath the crossover. Thus pillar type short circuits are broken, and any metallic debris is dislodged and flushed away.

A typical crossover may be formed of a gold beam 2 which may be of the order of 500 microns to 3,500 microns in length, 100 microns in width, and 10 to 25 microns in thickness, supported by gold pillars 4 with a clearance of the order of 10 to 25 microns above the dielectric substrate 5, which may be of ceramic or glass, and a corresponding clearance above the crossunder 3 which may, for instance, be gold having a thickness of 2 to 5 microns over a bonding layer of titanium and a shielding layer of platinum, each having a thickness of a fraction of a micron.

EXAMPLE

A group of 75 ceramic circuit boards having thin film gold circuitry patterns and containing a total of approximately 7,000 such crossovers constituted rejects because of crossover short circuits. When these circuit boards were subjected to a preferred process of the present invention, 87 percent of the short circuits were cleared, resulting in a recovery of 77 percent of the defective boards. In this process, the substrates were first heated in air to a temperature of approximately 350° C. and then allowed to return to room temperature. This procedure caused an expansion and annealing of the gold beams and rendered the subsequent treatment more effective. The substrates were then placed in a horizontal position in a closed chamber which was then evacuated and maintained at an absolute pressure of about 10 torr. Throughout the subsequent procedure in order initially to remove air from the space under the crossovers and thus allow penetration of the treating media and also, in the subsequent phase, to encourage more vigorous evolution of gas. A slurry of finely divided ammonium bicarbonate in water, in the proportion of 2,000 grams of ammonium bicarbonate per liter of water, was introduced into the evacuated chamber by means of a tube which deposited enough of the slurry on the surface of the substrate to cover at least those portions in which the short-circuited crossovers were located. Thereupon, a similar amount of an 8 molar solution of acetic acid as introduced in the same manner, resulting in the vigorous evolution of carbon dioxide which bowed the gold beams upward and flushed debris from the space beneath them, resulting in the elimination of short circuits as described above. In some cases, a number of the remaining short circuits were caused by slender threads of gold which were deflected but not removed by the flushing action. These were eliminated by the prior art method of treating for a short time, such as 15 seconds, with a gold etch, such as dilute aqua regia, which was sufficient to dissolve away the slender threads without significantly affecting the remaining portions of the device. The substrates were then washed in deionized water, rinsed in ethyl alcohol and dried.

Advantageous results can be obtained with substantial variation in the conditions set forth in this example. The initial heating step can be omitted, although generally with less effective results. The initial heating step will itself ordinarily eliminate a substantial fraction of the short circuits as well as conditioning the crossovers for more effective subsequent treatment. When heating is employed, a temperature of at least 250° C. is desirable. The maximum temperature to be employed is limited only by the incidence of detrimental effects upon the substrates or the circuit components. Ordinarily temperatures above 450° C. will not be employed. Heating is ordinarily carried out for from 1 to 3 minutes, although shorter or longer times may be used where suitable. Heating may be carried out in air or an inert atmosphere.

In place of ammonium bicarbonate, other substances which liberate gas in sufficient quantities upon contact with an acid solution can be used, such as, for instance, other bicarbonates, as of sodium, potassium or lithium, or, less effectively, the carbonates, as of ammonium, sodium, potassium, lithium, calcium or magnesium. The relative proportions of this gas-liberating material and the aqueous suspension medium need only be such that there is sufficient liquid on the one hand to provide the mobility necessary to allow the slurry to penetrate the minute spaces under the crossovers, and sufficient suspended material, on the other hand to release the required quantities of gas. Ordinarily, the slurries will contain between 2,000 and 3,000 grams of gas-liberating material per liter of aqueous medium.

Any aqueous acid solution, organic or inorganic, capable of evolving the required amount of gas with sufficient rapidity can be used in any concentration which will achieve this result. The organic acids, such as formic, acetic or oxalic, are preferred since they do not tend to contribute ionic residues. Ordinarily concentrations between 4 molar and 10 molar will be used.

It is necessary that the slurry penetrate the minute spaces under the crossovers. This is most readily assured by evacuation of these spaces to remove air before the slurry is applied, but any other technique which will achieve this result may be used instead.

Similarly maintenance of vacuum during the period of gas evolution renders the procedure more effective but operation at atmospheric pressure can be used where the ease of processing is considered to compensate for the decreased effectiveness. Any degree of evacuation can be employed, with increasing effectiveness accompanying increased evacuation. It is ordinarily desirable that a vacuum be maintained which is at least as great as an absolute pressure of 50 torr.

When etching is used to remove slender filaments of gold, this treatment can advantageously be applied before the gas evolution treatment instead of after.

Techniques of beam lifting and debris sweeping by gas evolution other than that described in the specific example can be used to reduce the incidence of crossover short circuits but in general with less effectiveness. Thus, volatile liquids such as ethyl alcohol, xylene or acetone can be projected onto the surface of substrates maintained in an evacuated chamber and the resulting rapid volatilizing will achieve an effect similar to the gas evolution in the specific example. A similar effect can also be achieved with liquid or liquefiable polymers containing foaming agents and curing agents and which are activated by heat or other known techniques after they have penetrated under the crossovers. Such foams can be cured or otherwise rendered rigid and can remain under the crossover beams after their expansion has accomplished the beam lifting and flushing function. With viscous polymers, a lesser degree of gas evolution is required than with the less viscous liquids.

With the treatment of the present invention, the yield of substrates bearing circuitry completely free from crossover short circuits can be improved sufficiently to permit consideration of a production procedure which uses gang testing of the crossovers instead of expensive individual testing. This is accomplished by depositing on the substrate a temporary conductor pattern connecting in each of a plurality of parallel circuits as many crossovers and/or crossunders as possible without including in the same circuit the crossover and crossunder from the same pair. With a minimum number of test points, the presence or absence of short circuits between these temporary parallel circuits can be determined. For those devices determined to be free from short circuits, the temporary conductor pattern is removed by etching. The test procedure can be used for determining those devices requiring the gas evolution treatment of the present invention or the gas evolution treatment can be routinely applied to all production and the test procedure used as a final check to separate unsatisfactory product.

What is claimed is:

1. In the method of reducing the incidence of metallic debris and pillar type short circuits at crossovers on a substrate containing patterns of thin film circuitry and having crossover beam conductors separated by a space from crossunder conductors, the improvement comprising utilizing an introduction of a liquid within said space and a subsequent generation of a vigorous evolution of gas within said liquid to cause a bowing of said beam outwardly away from said substrate and a flushing of said space, thereby breaking the pillar type short circuites and dislodging any metallic debris thus reduding the incidence of said short circuits.

2. The method of claim 1 wherein the evolution of gas is accomplished by reacting, in said space, a bicarbonate and an acid which decomposes said bicarbonate to cause evolution of carbon dioxide.

3. The method of claim 1 wherein the evolution of gas is accomplished by applying a slurry of ammonium bicarbonate in water to the surface of said substrate which is maintained at reduced atmospheric pressure and an aqueous solution of an acid is applied to said surface while it is maintained at reduced atmospheric pressure.

4. The method of claim 3 wherein the acid is acetic acid.

5. The method of claim 1 wherein the crossovers are first heated to a temperature of at least 250° C. and then allowed to cool.

6. The method of claim 1 wherein, in addition to the gas evolution treatment, the crossovers are subjected to the action of an etchant for the metal of which the crossovers are formed.

* * * * *